United States Patent [19]

Meijer

[11] Patent Number: 4,694,952
[45] Date of Patent: Sep. 22, 1987

[54] SCRAPER CLEANING APPARATUS FOR REVERSIBLE CONVEYOR BELTS

[75] Inventor: Johan B. A. Meijer, Hellevoetsluis, Netherlands

[73] Assignee: Rodiac Intercessor Ltd., Zug, Switzerland

[21] Appl. No.: 681,999

[22] PCT Filed: May 16, 1984

[86] PCT No.: PCT/EP84/00156
§ 371 Date: Dec. 3, 1984
§ 102(e) Date: Dec. 3, 1984

[87] PCT Pub. No.: WO84/04516
PCT Pub. Date: Nov. 22, 1984

[30] Foreign Application Priority Data

May 16, 1983 [NL] Netherlands ............... 8301730

[51] Int. Cl.$^4$ ............................................. B65G 45/00
[52] U.S. Cl. ................................. 198/499; 15/256.5; 474/92
[58] Field of Search ............... 198/499, 497; 474/92; 15/256.5, 256.51, 256.6

[56] References Cited

U.S. PATENT DOCUMENTS

| | | | |
|---|---|---|---|
| 3,163,878 | 1/1965 | Smith et al. | 15/256.51 |
| 3,748,686 | 7/1973 | Winterburn et al. | 15/256.51 |
| 3,803,665 | 4/1974 | Winterburn et al. | 15/256.51 |
| 4,290,520 | 9/1981 | Rhodes | 198/499 |
| 4,529,084 | 7/1985 | Zhang | 198/499 |

FOREIGN PATENT DOCUMENTS

| | | |
|---|---|---|
| 1015382 | 9/1957 | Fed. Rep. of Germany . |
| 2709714 | 9/1978 | Fed. Rep. of Germany . |
| 193090 | 12/1937 | Switzerland . |

Primary Examiner—Joseph E. Valenza
Assistant Examiner—Jonathan D. Holmes
Attorney, Agent, or Firm—Fleit, Jacobson, Cohn & Price

[57] ABSTRACT

A scraper cleaning apparatus for reversible conveyor belts comprising a plurality of individual scraper elements which are all simultaneously pressed against the belt by the coordinated operation of first and second flexible vessels by which the scraper elements can be disengaged from the belt when reversing the direction of movement of the belt.

5 Claims, 2 Drawing Figures

SCRAPER CLEANING APPARATUS FOR REVERSIBLE CONVEYOR BELTS

BACKGROUND OF THE INVENTION

The invention consists of a scraper cleaning apparatus for reversible conveyor belts and includes a first scraper means, mounted in the vicinity of a first discharge station of the conveyor belt, and a second scraper means, mounted in the vicinity of a second discharge station, in which system, dependent on the direction of movement of the conveyor belt, one of the two scraper means is continuously active while the other remains inactive. A conventional apparatus of this type is not detached from the belt, which results in the disadvantage that, in combination with the usual adjusting means, and the applied pressure springs of the independent scraper arms, the scraper blades when inactive keep scraping against the belt, causing accumulation of dirt into undesirable locations, because the dirty side of the belt moves into a position where material, which is to be transported, is discharged onto the belt a couple of yards after passing the inactive scraper blades. Furthermore in the dragging position, the blades are sharpened in such a way that, dependent on the frequency of the conveyor belt apparatus, in combination with the experimentally chosen rubber springs for the scraper blades, the surface layer of the conveyor belt may be seriously damaged, which afterwards makes proper cleaning impossible.

A problem of known apparatuses lies in keeping the scraper blades under constant pressure against the surface to be scraped and cleaned, because the pressure force is affected by wear of the blades, by the different thickness both in the transverse and in the parallel direction of the conveyor belt and by the movement of the belt. Due to these factors in combination with the fact that the scraper means becomes dirty and because the location of the scraper mounting is hard to inspect, in practice the adjusting of the scraper means is a difficult and time-consuming matter.

The adjustment problem of the usual scraper apparatus results in selection of such an adjusting position that the average operation between the periodical adjustments is less than optimal.

SUMMARY OF THE INVENTION

The scraper apparatus for a conveyor belt according to the invention consists of a number of scraper elements, placed in a staggered position, which number depends on the width of the conveyor belt, at one extremity of lever arms, of which the opposite ends are fixed by a vessel means, having a flexible wall which is placed parallel to the support housing and of which the inner side is kept under pressure while the apparatus is in operation, in order to keep the scraper elements against the surface of the conveyor belt with sufficient pressure force.

A second vessel, which acts against the pressure force of the first vessel means will serve to disengage the scraper elements from the conveyor belt surface when the direction of movement of the conveyor belt is reversed.

Furthermore, the second vessel means will serve to affect the oscillatory behavior of the scraper elements and, when the scraper arms become dirty, they can be tapped or beaten clean against the conveyor belt by alternately exerting higher pressure on the first vessel means or the second, respectively.

The support housing which is fixed at both sides by separate supporting means, consists of two vessel means in which different pressures are maintained and/or are provided with flexible walls of different thicknesses, and made of rubber or synthetic material. The ends of a number of lever arms, which number depends on the width of the conveyor belt, are located between the two vessel means, thus pressing the scraper blades via hinge joints, against the conveyor belt surface to be cleaned.

When using gas under pressure in the vessel means, preferably compressed air, in order to keep the scraper elements against the surface of the conveyor belt, a uniform pressure force is provided right across the conveyor belt, which makes it possible that uneven parts, such as damaged portions or the connecting conveyor belt joint, can freely pass beyond the scraper means, because the scraper elements and their lever arms can easily yield away. The width of the scraper elements and the mutual distances of their lever arms are chosen in such a way, that the scraper elements partly overlap, so that all parts across the conveyor belt are scraped and cleaned. The scraper elements can be made from tempered steel, synthetic material, rubber or from aluminium oxide.

The entry of dust into the support housing through the supporting means of the hinge joints is prevented by a lining or sealing of these openings by means of a flexible material.

For special purposes the housing can be installed in any position transversely under a conveyor belt, providing for adjustment of the position of the scraper elements.

The flexible vessel means may consist of hoses that are connected by a two way valve, so that by means of an auxilliary device, such as a double acting cylinder, which connects one vessel means with the space under the piston and the other vessel means with the space above the piston, the scraper means can be operated into active and inactive position by moving the piston.

BRIEF DESCRIPTION OF THE DRAWING

The invention will be explained in detail by means of the drawing in which.

DESCRIPTION OF THE PREFERRED EMBODIMENT

Figure 1:
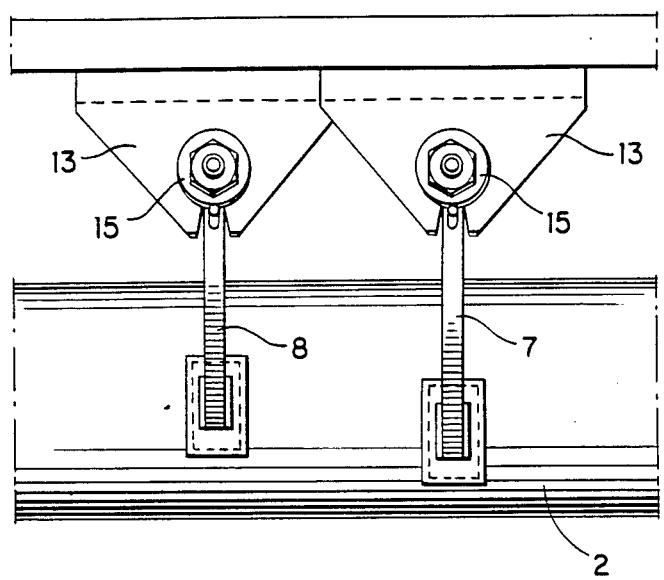
FIG. 1 is a front view of a support housing with supporting means and the lever arms, provided with scraper blades and FIG. 2 showing a side view of the scraper cleaning apparatus showing its operation.
Figure 2:
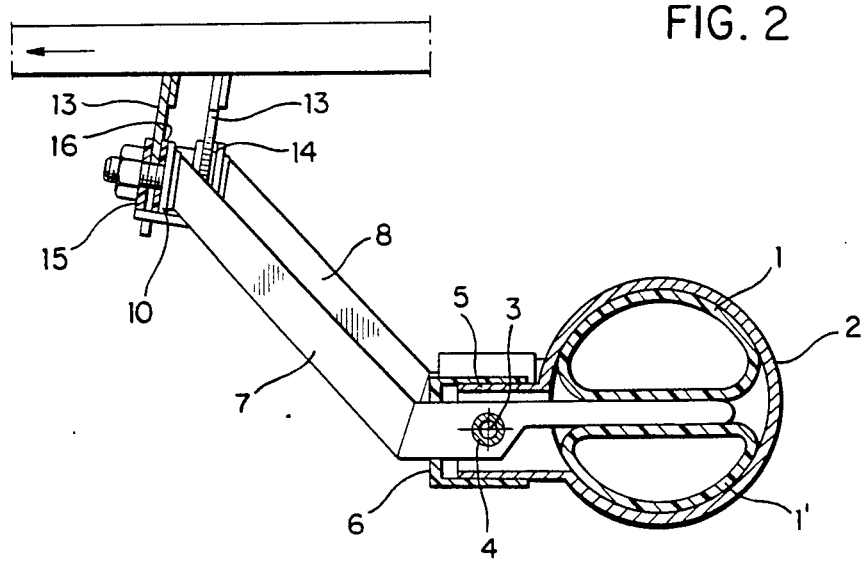

The scraper cleaning apparatus includes two vessel means 1 and 1' respectively which alternately are kept under higher pressure, dependent on the direction of movement of the conveyor belt, preferably operated by compressed air. The vessels 1 and 1' are mounted in a housing 2 by means of fixed hinge joint supporting means 5 at a mutual distance parallel to the longitudinal housing axis. In order to make the lever arms 7,8 press the respective scraper elements 13 under an equal scraping angle against the surface to be cleaned, the hinge joint supporting means 5 is fixed at a different height position to the housing 2 in the embodiment shown here. The axes 3 of each hinge joint 4 are alternately placed in such a way, that the scraper elements 13 are pressed under equal scraping angles against the belt surface to be scraped when the lever arms 7,8 are situated in the same position. The seal or lining 6, made of flexible material, prevents dirt from entering the housing 2 through the supporting means 5, so that the operation of the apparatus is not obstructed.

Each embodiment of the lever arms 7,8 is of different construction in order to keep the pressing surface of the vessel means as flat as possible and to enable the scraper elements 13 to operate in two rows, so that all parts of the conveyor belt are scraped by the active scraper elements 13. The extremities of lever arms 7,8, fixed between the vessel means 1, 1' are covered with a lining made of rubber or synthetic material so that wear of the vessel means 1, 1' is reduced to a minimum. The stop members 14 allow the scraper elements 13 to wear out up to a certain point. Counter stops 10 are provided on the lever arms 7,8, which, by means of recesses on the scraper elements 13, allow for the latter to adjust, within certain limits, to the shape of the running conveyor belt surface, but which prevent at the same time a scraper element 13 from tilting, which may cause damage to the conveyor belt.

The scraper elements 13, which are made of tempered steel or provided with tempered metal or made of synthetic material, rubber or aluminium oxide, are clampingly fixed to one extremity of the lever arms 7,8 between two synthetic discs 15,16, in such a way that the scraper elements 13, restricted in their movement by the counter stops 10, can adjust freely to the shape of the running conveyor belt, so that the pressure force is divided proportionally to the full width of the scraper elements 13.

Dependent on the conveyor belt tension and the material to be conveyed, the scraper cleaning apparatus according to the invention enables the contact pressure, existing between the scraper elements and the surface to be cleaned, to reach its maximum possible value. In practice, the minimum experimental pressure force can be adjusted and yet effective cleaning of the surface to be scraped will be achieved. A slight overpressure or feeding by means of a reducing valve will be sufficient to compensate for the pressure loss due to wear of the scraper elements.

I claim:
1. A conveyor belt cleaning device for a reversible conveyor belt, said cleaning device comprising:
 (a) a plurality of scraper blades extending transversely of and each being narrower than the width of the conveyor belt, said blades being positioned at substantially the same angle relative to the surface of the belt, spaced from each other along a longitudinal axis of the belt, and defining overlapping contact areas on the belt;
 (b) a plurality of lever arm means each having a first end on which respective scraper blades are adjustably carried, said lever arm means each having a second end spaced from said first end, and a lever pivot axis between said first and second ends, said lever pivot axes extending transversely to the longitudinal axis of the belt, successive pivot axes offset from and substantially parallel to each other;
 (c) supporting means for pivotally supporting said lever arm means for pivotal movement about said pivot axes so that said blades are able to yield to obstructions in the conveyor belt;
 (d) first and second flexible vessel means positioned on opposite sides of each said lever arm means adjacent said second ends to impart simultaneous pivotal movement to all of said lever arm means upon coordinated flexing of said first and said second vessel means so that the introduction of pressurized fluid into one of said vessel means causes pivotal movement of all said lever arm means to move said scraper blades into engagement with the conveyor belt and the introduction of pressurized fluid into the other of said vessel means causes pivotal movement of said lever arm means to move said scraper blades out of engagement with the conveyor belt.

2. A conveyor belt cleaning device according to claim 1, including common housing means within which each of said first and second flexible vessel means is contained, said housing means adapted to permit movement of each of said second ends of said lever arm means about said axes.

3. A conveyor belt cleaning device according to claim 2, wherein said common housing means has a tubular cross section and includes a plurality of longitudinally spaced openings to receive said second ends of said lever arm means.

4. A conveyor belt cleaning device according to claim 3, including flexible sealing means surrounding said spaced openings for closing the housing means.

5. A conveyor belt cleaning device according to claim 1, wherein the scraper blades are hingedly clamped between two discs of synthetic material for restricted movement to equalize the pressure force over the full width of each scraper blade.

* * * * *